Nov. 6, 1956   J. W. JUVINALL   2,769,728
APPARATUS FOR AND METHOD OF CONVEYING ARTICLES
Filed May 22, 1952   2 Sheets-Sheet 1
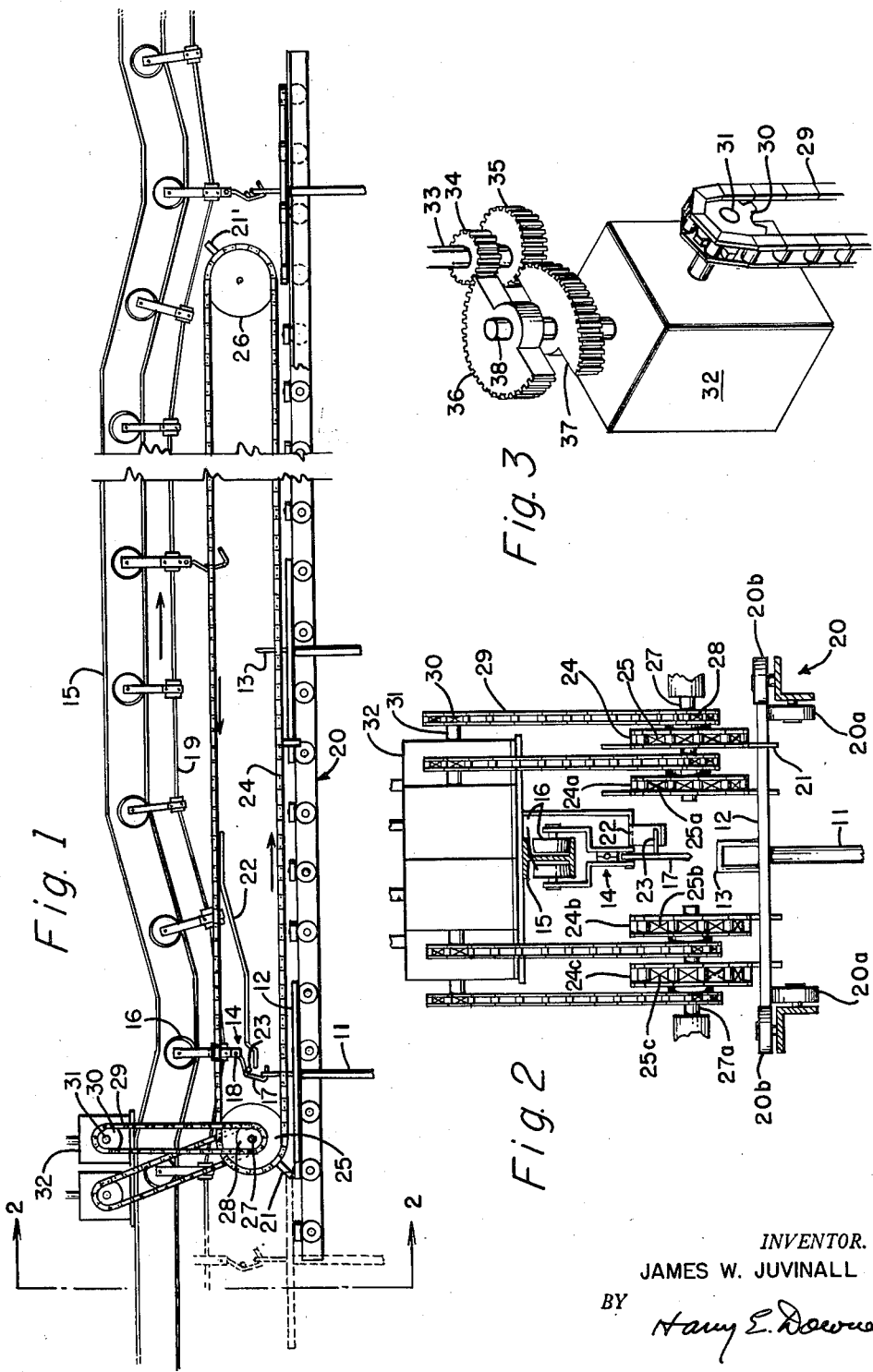
INVENTOR.
JAMES W. JUVINALL
BY
Attorney Nov. 6, 1956  J. W. JUVINALL  2,769,728
APPARATUS FOR AND METHOD OF CONVEYING ARTICLES
Filed May 22, 1952  2 Sheets-Sheet 2
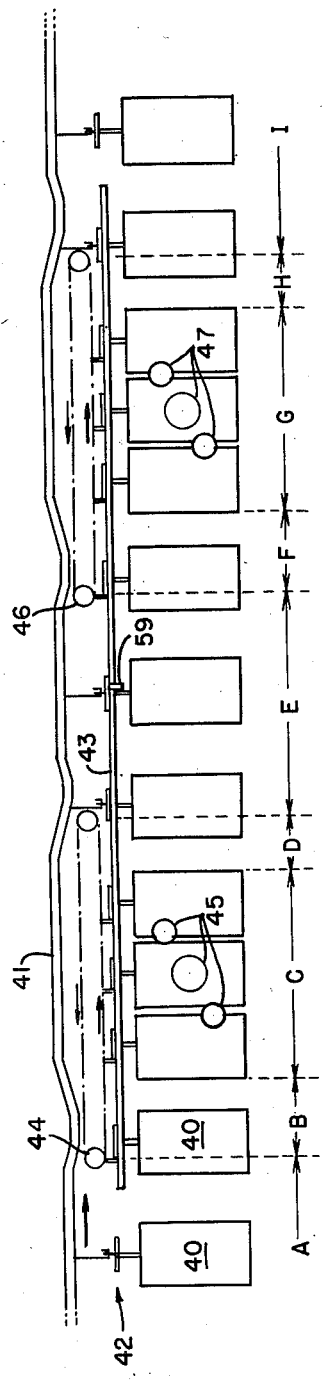
INVENTOR.
JAMES W. JUVINALL
BY
*Harry E. Downer*
Attorney United States Patent Office 2,769,728
Patented Nov. 6, 1956

2,769,728

APPARATUS FOR AND METHOD OF CONVEYING ARTICLES

James W. Juvinall, Indianapolis, Ind., assignor to Ransburg Electro-Coating Corp., Indianapolis, Ind., a corporation of Indiana Application May 22, 1952, Serial No. 289,333

11 Claims. (Cl. 117—104)

This invention relates to apparatus for and method of conveying a series of articles along a predetermined path and is particularly directed toward varying the speed of or the spacing between the articles being so conveyed.

Article conveying apparatus has long been used in industry for transporting a series of articles in succession over a predetermined path. Continuously moving conveyors are commonly used for carrying articles of manufacture past a number of stations for the successive processing of the articles. One of the most common types of conveyors for this purpose comprises an I beam track positioned over the desired path for the articles, a series of trolleys having rollers which ride on the upper surface of the lower flange of the I beam, article supporting structure joined to each trolley, and a power-driven flexible member as a cable or a chain. The trolleys are normally affixed, with a uniform spacing between them, to the power-driven flexible member so that the trolleys, each carrying an article supporting structure, are moved in succession along the I beam track. In such conventional apparatus it is apparent that the speed and spacing as between adjacent articles are fixed and may not be varied.

It is often desirable that the articles be more intimately spaced as they moved along a particular portion of the path or that the articles be moved past a predetermined point on the path at a speed which may be somewhat greater or less than the normal speed of the articles along the remainder of the path. A speed slower than normal may be desired for the articles as they move past a particular station to permit a certain operation on or to the article which requires some time for its performance. Likewise, it may be necessary to "bunch up" the articles as they move past a station so as to present the articles at a conveniently close spacing for processing.

As one example of the flexibility in article spacing often sought in article conveying apparatus, the spray coating of relatively large rectangular articles, such as electric refrigerator cabinets, requires that the articles be normally spaced with a uniformly wide spacing between them to permit their being hung on the conveyor to permit certain pre-coating operations, or to allow the moving articles to turn corners or move along an incline without danger of their bumping together. In a subsequent coating zone, however, close spacing is desired to prevent waste of coating material which would otherwise be projected between widely spaced articles and also to obtain a more uniform coating by presenting the closely spaced articles in an arrangement which approximates a continuous web or flat sheet of material.

By positioning coating apparatus in the coating zone on either side of the moving articles two of the four sides of rectangular articles may be simultaneously coated but before the articles can be indexed or rotated 90° so that the other two sides of the articles may be presented for coating, it is necessary to first increase the spacing between the articles to permit indexing without bumping or contact between adjoining articles. Thus the spacing between the articles must be increased, the article then indexed 90°, and the spacing between the articles again decreased to present closely spaced articles for entrance into the second coating zone where the two remaining sides of the article can be spray coated. As the articles leave the coating zone the spacing between articles should be increased to permit post-coating operations to be performed on the articles and to remove the danger of contact between adjacent freshly coated surfaces.

An object of my invention is to provide an article conveying apparatus in which the speed of and/or spacing between articles may be varied as the articles move along the conveyor.

Another object of my invention is to provide means to minimize shocks on conveyor apparatus and to reduce inter-article motion when articles being conveyed undergo a change in velocity.

A further object is to provide an improved apparatus and method for the spray coating of articles.

Still another object is to provide an improved article supporting structure for supporting articles being carried on a moving conveyor.

A still further object is to provide for varying the speed of and/or spacing between articles carried on a conveyor and to do so in a positive and controlled manner.

Yet another object is to provide improved means to incrementally vary the speed or spacing of a series of article supports otherwise independently movable along a predetermined path.

My invention provides for gradual, i. e., incremental acceleration or deceleration of conveyor-borne articles in a positive and controlled manner over a substantial portion of their path of travel so as to prevent abrupt changes in the rate of movement of the article. In one embodiment of my invention a part of each article supporting structure may be disengaged from the main conveyor track as the structure reaches a predetermined point where it is transferred to a separate track as an independently movable structure and propelled by a suitable pusher which moves at a positively controlled variable speed, thus to gradually accelerate or decelerate the movement of the article along specified portions of the path or to increase or decrease the spacing between articles as desired. When it is no longer required to vary the speed or spacing of the articles, the structure may be transferred to and re-engaged with a conventional conveyor track for movement therealong at a constant speed and with a fixed distance between the article supporting structures. Various other means for positively accelerating and/or decelerating a series of article supports along a predetermined path may be employed without departing from the scope of my invention. For two applications which disclose means for accomplishing this, reference is made to the co-pending application of Norman S. Curtis, Serial No. 291,723, dated June 4, 1952, and the joint application of Norman S. Curtis and Robert C. Juvinall, Serial No. 308,856, dated September 10, 1952.

The principle of my invention may be utilized with especially beneficial results in the coating of articles being moved on a series of independently movable article supports along a conveyor by proper coordination of apparatus for incrementally varying the velocity of the articles with spray coating apparatus.

Apparatus for accomplishing the above stated and related objects of my invention is hereinafter fully described with reference to the accompanying drawnigs wherein:

Fig. 1 is an elevational view, somewhat diagrammatic, of a preferred embodiment of my invention;

Fig. 2 is a cross sectional view of the apparatus shown in Fig. 1, taken along line 2—2.

Fig. 3 is a detailed isometric view of a portion of the driving means shown in Fig. 1;

Fig. 4 is a diagrammatic elevation of apparatus embodying my invention and adapted for the spray coating of articles; and Fig. 5 is an isometric view of the indexing and article-supporting mechanism used in the apparatus shown in Fig. 4.

Referring first to Figs. 1, 2 and 3, the articles to be coated (not shown) are suspended from a series of article supports 11, each of which extends downwardly from the lower face of an article-supporting horizontal square plate 12. A hook-engaging member 13 with a horizontal center section is connected to the upper face of plate 12. In those portions of the article path along which the articles are to travel in the conventional manner with uniform speed and spacing, the several article supporting structures (support 11, plate 12 and member 13) are carried and propelled by means of trolleys 14 which straddle the lower flange of the main I beam track 15, and which are provided with rollers 16 rolling along the upper faces of the lower flange of the I beam. Track 15 is endless, in the manner of conventional trolley supporting conveyor tracks, so that the series of trolleys may pass repeatedly over it. Except over those portions of the article path in which movement of the articles is to be controlled in accordance with this invention, each of the article supporting structures is releasably connected to one of the trolleys as by a hook 17 pivotally connected to the trolley 14 by a transverse pin 18 and formed at its lower end to engage members 13 of the associated article supporting structure. Trolleys 14 are connected at spaced intervals in any convenient manner to an endless cable 19 which generally parallels the endless track 15 and is driven by a suitable source of power (not shown) at a uniform velocity. Along portions of the article path where the articles are to move at different speeds or spacings, the article supporting structures are disconnected from trolleys 14 in a manner now to be described.

As trolley 14 approaches that portion of the path along which a different speed or spacing of the articles is required, plate 12 moves over a separate conveyor track 20 which comprises two parallel series of vertical rollers 20a for supporting plate 12 and two series of horizontal rollers 20b arranged to lie on either side of the plate for guiding it along its predetermined path. At this point on the path, track 15 dips downwardly sufficiently so that plate 12 rests on track 20. At the same time pusher 21 will come in contact with the rear edge of plate 12. Pusher 21 will be moving initially at a speed slightly in excess of the speed of trolley 14, and as track 15 continues to dip downwardly the lower portion of hook 17 will be entirely below and to the rear of the horizontal center section of member 13. Plate 12 and member 13 will be propelled ahead of hook 17 and will be freed from the forward motion of cable 19. To insure the disengagement of hook 17 from member 13, cam 22 may be positioned over track 20, as by being suspended by suitable supports from the upper flange of I beam track 15. Cam 22 may be arranged cooperatively with lug 23 extending horizontally from hook 17 so that immediately after the hook has lowered plate 12 onto track 20, lug 23 will strike the leading edge of cam 22. The forward movement of trolley 14 will cause hook 17 to pivot about pin 18 so the lower end of the hook will move rearwardly and upward out of engagement position. Track 15 will then rise slightly thus raising hook 17 to such a height that it can no longer engage a member 13 of any article supporting structure moving on track 20.

Plate 12 is then propelled along track 20 solely by means of pusher 21 by which the desired velocity changes are imparted to the article supporting structure. As shown pusher 21 is rigidly connected to and extends outwardly from a movable chain 24 which is mounted on driving sprocket 25 and idler sprocket 26 so that along its major portion chain 24 moves parallel to and above track 20. Sprocket 25 is mounted for rotation on suitable roller bearings about fixed shaft 27. Sprocket 25 is concentrically joined to sprocket 28 which is driven by a chain 29 from driving sprocket 30 which is keyed on shaft 31 extending from gear box 32. The speed of pusher 21 is controlled by the speed of rotation of sprockets 25 and 28 which is in turn controlled by the speed of rotation of sprocket 30 and shaft 31. Shaft 31 is driven by a step-up gear train within gear box 32.

Rotary power is supplied to gear box 32 by means of an eccentric pinion and elliptical gearing mechanism which is shown in detail in Fig. 3. Shaft 33 is rotated at a constant speed from a convenient source of power (not shown). Pinions 34 and 35 are keyed to shaft 33. Smaller pinion 34 is concentric with the shaft and meshes with a half spur gear 36. Larger pinion 35 is eccentrically mounted on shaft 33 and meshes with a half elliptical gear 37; the two gear segments 36 and 37 being keyed to driven shaft 38 which is the input shaft of gear box 32.

The eccentric-elliptical combination of gearing may be constructed to provide any desired velocity pattern within a wide range. In the embodiment shown one revolution of shaft 38 is obtained for every three revolutions of driving shaft 33; two revolutions of the concentric pinion 34 being required for a half revolution of shaft 38, and one revolution of eccentric pinion 35 for the remaining half revolution. This 360° cycle of rotary motion requiring one complete revolution of shaft 38 is imparted to the train of gears within gear box 32 where the cycle will be stepped up and translated to shaft 31. Thus while pinion 34 is driving gear 36 there will be a relatively slow and uniform rotation of shaft 31 which may be approximately one-half of the speed of trolleys 14, but as the eccentric pinion 35 starts to drive the speed of shaft 31 will be gradually accelerated and, after reaching a maximum which may be somewhat greater than the speed of trolleys 14, gradually decelerated toward the slow uniform speed. This cycle of motion may be properly coordinated and transmitted from shaft 31 through sprocket 30, chain 29, sprockets 25 and 28 and chain 24 to pusher 21, so as to provide the desired changes in velocity of pusher 21 for transmittal to the article supporting structure. The apparatus just described will impart a decelerating-constant velocity-accelerating cycle which will decelerate during one quarter of the cycle, remain constant during one half the cycle and accelerate during the remaining quarter of the cycle.

As shown pusher 21 rotates into propelling position and initially engages the rear edge of plate 12, which will be propelled along a small first portion of track 20 with an accelerating motion while power is being supplied from pinion 35 to the latter part of the speed accelerating portion of elliptical gear 37. This short period of acceleration will permit plate 12 to be pushed by pusher 21 at a rate slightly in excess of the speed of trolley 14 so that member 13 will move ahead of hook 17 and the hook may be disengaged from member 13 as previously described. Then, as power is supplied from the speed decelerating portion of elliptical gear 37, the forward motion of plate 12 will be gradually decreased to permit successively trailing plates to "catch up" and to effect a decrease in the spacing between articles by a positive means and at a controlled gradual rate. Next, while pinion 34 drives spur gear 36, uniform motion will be transmitted to pusher 21 so that it will propel plate 12 at a constant slow speed and with a uniformly close spacing between articles.

While the articles are thus closely spaced they may be moved into cooperating position with appropriate processing equipment for which close spacing of the articles is desired. After the articles have been processed while moving at a uniform close spacing, eccentric pinion 35 will again engage elliptical gear 37 so that the speed of pusher 21 will be incrementally increased along a substantial portion of the path. Plate 12 will thus be incrementally accelerated toward the speed of cable 19. At this point on the path track 15 dips slightly downward so that hook 17 will be lowered into engaging position behind member 13. When pusher 21 carried on chain 24 reaches sprocket 26 the pusher will be revolved upwardly out of contact with plate 12, so that hook 17 will overtake the plate and again engage the horizontal center section of member 13. Track 15 here rises again and as trolley 14 moves upwardly it will lift plate 12 from engagement with rollers 20a and article supporting structure will continue along track 15 at a constant velocity and with a uniform spacing between adjacent articles.

It is noted that pusher 21 undergoes two periods of acceleration—one at each end of its movement in engagement with plate 12—and that the extent of such movement is somewhat less than one-half the developed length of chain 24. Accordingly it is possible, as shown, to mount two pushers 21 and 21' on chain 24, separating them by an interval equal to one-half the length of the chain, and to so proportion the chain-driving mechanism so that the chain traverses its entire length while shaft 38 is making two complete revolutions. The mechanism is so arranged that each pusher moves into and out of engagement with a plate 12 during a period of pusher acceleration and at times when the velocity of the pusher approximates that of cable 19. In the specific arrangement shown, each pusher is in engagement with a plate 12 for somewhat less than the interval required for a full cycle of motion transmitted by a 360° revolution of shaft 38 due to the fact that during a one-half revolution of chain 24, a pusher must traverse the center-to-center distance between sprockets 25 and 26 plus one-half the circumference of either of these sprockets. Thus pusher velocity cannot exactly equal cable velocity both when the pusher engages with and disengages from the plate. Accordingly, at least at one of the instances when the article supporting structure changes from being cable-propelled to being pusher-propelled, or vice versa, it will undergo a somewhat abrupt change in velocity. This is not serious, however, for any such change can be small and, since it occurs when adjacent articles are at their maximum spacing, the slight inter-article movement which might result is not commercially objectionable.

As will be obvious the mechanism must include one pusher for each of the article supporting structures simultaneously traversing track 20 and all these pushers must be capable of independent movement to accommodate the changes in article spacing resulting from the desired acceleration and deceleration. In the device shown it is contemplated that four article supporting structures will move at any given time in seriatim along track 20 and accordingly three additional chains 24a, 24b, and 24c are provided. These chains, each of which mounts two pushers, are identical to chain 24, and are rotatably mounted on driving sprockets 25a, 25b and 25c respectively and on three separately rotatable idler sprockets (not shown but identical to idler sprocket 26). Driving sprockets 25a, 25b, and 25c are rotatably mounted concentrically with driving sprocket 25 on fixed shafts 27 and 27a. As shown in Fig. 2, sprockets 25 and 25a are mounted on shaft 27 on one side of main track 15 with sprockets 25b and 25c mounted on fixed shaft 27a on the other side of track 15. Four separate power transmission systems each comprising a driven gear, a chain, a driving sprocket, a gear box and an eccentric-elliptical gear combination, identical to the power transmission system used for driving chain 24 as previously described, are employed to independently drive sprockets 25a, 25b, and 25c respectively. The pushers mounted on chains 24, 24a, 24b and 24c are mutually spaced so as to accommodate a steady arrival of supporting plates 12 beneath the driving sprockets to be propelled in succession along track 20, and to deliver the article supporting structures in seriatim to the end of track 20 appropriately timed for reengagement with a moving hook 17.

Figs. 4 and 5 show the above described embodiment of my invention adapted for the spray coating of the four sides of rectangularly shaped articles which may be rectangular metal cabinets or the like. For convenience of illustration I have shown the articles 40 passing in succession through zones A through I. Articles 40 are carried along main conveyor track 41 on a series of article supporting structures 42. In zone A the articles will move along track 41 at a constant rate and with uniform spacing between successive articles. As each successive article supporting structure 42 enters zone B a portion of supporting structure 42 and article 40 supported thereon is transferred from main track 42 to separate conveyor track 43.

As articles 40 are transferred in succession from track 41 to 43 they will be propelled along a first portion of track 43 by a variable speed pusher mechanism 44 with a deceleration-constant velocity-acceleration speed cycle and this mechanism may be similar to the eccentric-elliptical gear driving means shown in Figs. 1, 2 and 3. The articles move through zone B at an incrementally decelerating speed causing them to "bunch up." Then the articles are moved at a constant slow speed through coating zone C with a small spacing between successive articles. In zone C the articles move into cooperation with spray coating means which may comprise three electrostatic spray coating heads 45 positioned along track 43 on each of the two sides of the articles to be coated. Such an arrangement of spray heads is shown and described in my co-pending application, Serial No. 257,741, previously filed on November 23, 1951. The spray from each head 45 when positioned as set forth in my said co-pending application will blend with the spray from the two adjacent heads to form a uniform coating over the entire surface of each of the two outwardly facing sides of articles 40.

As articles leave coating zone C and enter zone D the speed of the articles is incrementally increased throughout zone D so that the spacing between successive articles will gradually increase to the speed of track 41. The articles then leave propelling means 44 and enter indexing zone E where the articles, still supported on track 43, will be temporarily re-engaged with the propelling means used to propel articles along main conveyor track 41 in their normally widely spaced position. In this position the articles will be successively indexed 90° as by the apparatus shown in Fig. 5 and which will hereinafter be more fully described. The two remaining sides which were not spray coated as the articles passed through zone C will now be positioned outwardly so that these sides may be spray coated. The articles then move into zone F for engagement with a second variable speed pusher mechanism 46 which may be generally similar to mechanism 44. The articles in zone F are incrementally decelerated and then moved into coating zone G where the articles move at a constant slow speed past three electrostatic spraying heads 47 similar to those previously mentioned located on each side of articles 40 and arranged so that a uniform coating will be applied to the entire surface of each of the two outwardly facing sides of the article. Upon the articles leaving coating zone G they will be incrementally accelerated throughout the length of zone H by pusher mechanism 46. The acceleration of the articles in zone H must be especially gradual and without any appreciable inter-article movement due to the closely spaced, opposing freshly coated surfaces of adjacent articles. Upon completion of this very gradual acceleration, the articles are returned to main conveyor track 41 for continued travel throughout zone I at a constant speed and with uniform wide spacing between articles.

Fig. 5 shows the details of an indexing and article supporting mechanism adapted for embodiment in the apparatus shown in Fig. 4 and just described. Track 43 comprises two parallel supporting members 50 and 51 on which are mounted two parallel series of cylindrical idler rollers 52a and 52b which support horizontal square plate 53 of the article supporting structure designated generally as 42. Plate 53 is guided by two parallel series of rollers 54a and 54b mounted on the horizontal flange of members 50 and 51 respectively. The use of such a horizontal flat plate will serve to substantially reduce swinging, swaying and other inter-article movement because of the stability and support furnished to the article supporting structure by the wide horizontal expanse of the plate. This improved article stability is important not only to substantially eliminate inter-article contact, but also to prevent appreciable movement or swaying of articles transverse to the conveyor path which in a coating zone will cause fluctuations in the spacing between the spray source, as for example head 47, and the articles which in turn might well result in objectionable variations in the pattern of the spray.

Bracket 55 is connected to the bottom face of plate 53 and this bracket supports article hanger 56. Upper segment 57a of positioning cam 57 is rigidly affixed to the upper end of hanger 56 and lower segment 57b of this cam is mounted on bracket 55. A four-toothed cam wheel 58 is rigidly mounted concentrically about hanger 56. As plate 53 is propelled through zone E along track 43 one of the teeth of cam wheel 58 will strike indexing arm 59, arm 59 being positioned along track 43 as shown in Fig. 4 thus causing article hanger 56 and supported article 40 to rotate 90°. After being indexed the article will be held in its new position by positioning cam 57.

While I have disclosed specific apparatus, by way of example, to illustrate my invention, numerous modifications and adaptations may be made without departing from the scope of my invention. It is to be understood that my invention is not limited to the apparatus herein described but that the scope of the invention is that set forth in the appended claims.

I claim:

1. A method of coating the sides of a plurality of generally cubically shaped articles as the articles move along a predetermined path comprising supporting the articles in seriatim along a track with adjacent outwardly facing sides of adjacent articles positioned in common planes, said outwardly facing sides of said adjacent articles forming two substantially continuous surfaces to be coated, moving said articles through a first coating zone, spray coating the outwardly facing opposite sides of said articles, uniformly increasing the spacing between adjacent articles, indexing each article approximately 90°, uniformly decreasing the spacing between articles until adjacent outwardly facing sides of the articles form two substantially continuous surfaces to be coated, moving said articles through a second coating zone, and spray coating the outwardly facing opposite sides of said articles.

2. An article coating apparatus comprising a series of independently movable supports for the articles to be coated, means for guiding said supports in succession over a predetermined path, means for moving said supports along a first portion of said path at a constant rate and with a uniformly wide spacing between supports, means for moving said supports with a gradually decreasing spacing between said supports along a second portion of said path, means for moving said supports along a third portion of said path at a constant rate and with a uniformly close spacing between supports, spray coating means located along said third portion of said path and in coating cooperation with respect to the articles carried by said supports traversing said third portion of the path, means for moving said supports with a gradually increasing spacing between said supports along a fourth portion of said path, means for moving said supports at such increased spacing along a fifth portion of said path, indexing means for rotating each support through an arc of 90° at a predetermined point along said fifth portion of the path, means for moving said supports with a gradually decreasing spacing between said supports along a sixth portion of said path, means for moving said supports along a seventh portion of said path at a constant rate and with uniformly close spacing between supports, spray coating means located along said seventh portion of said path and in coating cooperation with respect to the articles carried by said supports traversing said seventh portion of the path, means for moving said supports with a gradually increasing spacing between said supports along an eighth portion of said path, and means for moving said supports along a ninth portion of said path at a constant rate and with a uniformly wide spacing between supports.

3. An article conveying apparatus comprising a series of independently movable article supports each including a horizontal plate; first and third guiding means for guiding said supports in succession over first and third portions of a predetermined path; first propelling means for propelling said supports over the first and third portions of said path at a constant rate and with uniform spacing between said supports; second guiding means comprising a series of idler supporting rollers supporting said horizontal plate and also a series of idler guiding rollers on either side of said plate and extending in the direction of said predetermined path for guiding said supports in succession over a second portion of said path; means for disengaging said first propelling means from said supports as the supports enter said second guiding means; second propelling means for propelling said supports along said second guiding means at a controlled variable speed; means at the end of said second guiding means for disengaging said second propelling means from said supports and means for re-engaging said first propelling means with said supports to propel said supports along said third portion of said path.

4. A conveying apparatus for conveying a series of articles along a predetermined path comprising a main conveyor track; an auxiliary conveyor track; a series of trolleys movably mounted on said main conveyor track; means for moving said trolleys with uniform speed and spacing along said main conveyor track; a series of article supports carried along a portion of said main conveyor track by said trolleys each comprising a horizontal plate, an article hanger rigidly depending from said plate, and a member connecting said support to said trolley; means operative on said connecting means positioned along said auxiliary conveyor track for disconnecting said article supports from said trolleys; and means for propelling said article supports along a portion of said auxiliary conveyor track at an incrementally varying rate.

5. An article coating apparatus comprising a series of independently movable supports for the articles to be coated, means for guiding said supports in succession over a predetermined path, means for moving said supports along a first portion of said path at a constant rate and with relatively wide spacing between adjacent supports, means for moving said supports over a second portion of said path at a rate gradually reducing from the rate of movement of said supports along said first path portion to a substantially lower rate and with a gradual reduction in spacing between adjacent supports traversing said second path portion and then moving said supports over a third portion of said path at said lower rate and with a relatively close spacing between supports, and spray coating means located along said third portion of said path and in coating cooperation with respect to the articles carried by said supports traversing said third portion of the path for spray coating the articles.

6. An overhead conveying system for conveying an article along a predetermined generally horizontal path on a support while retaining the article in a fixed position relative to said support comprising a horizontal plate having a substantial extent both parallel to and transverse of the article path, an article support rigidly depending from said plate, means for rigidly mounting the article to be conveyed on said support, a conveyor track extending along said predetermined path, a series of plate-supporting rollers mounted on said conveyor track and extending along said predetermined path, two series of plate-guiding members mounted on said conveyor track and extending along opposite sides of said path, and means for moving said horizontal plate over said plate-supporting rollers and between said plate-guiding members.

7. A conveying apparatus for conveying a series of articles along a predetermined generally horizontal path comprising a main conveyor track; an auxiliary conveyor track; a series of trolleys movably mounted on said main conveyor track; means for moving said trolleys with uniform speed and spacing along said main conveyor track; a series of article supports carried along a portion of said main conveyor track by said trolley each comprising a horizontal plate having a substantial extent parallel to the article path, an article hanger rigidly depending from said plate, and a member connecting said support to said trolley; means for successively disconnecting said article supports from said trolleys at a point adjacent the initial portion of said auxiliary conveyor track; said auxiliary track being positioned to supportingly engage the plate of each article support after such support is disconnected from a trolley; means for propelling said article supports on said plates in seriatim along said auxiliary conveyor track; and means for re-connecting said article supports to said trolleys at a point adjacent the final portion of said auxiliary conveyor track.

8. A method of processing a plurality of articles, comprising moving the articles in succession along a predetermined path, maintaining each article at a substantially constant velocity until it reaches a predetermined point in such path, then gradually decelerating each article as it proceeds along a substantial portion of said path until it attains a predetermined relatively low velocity thereby reducing the spacing between it and the following article, moving the articles with reduced spacing and at low velocity along said path through a processing zone, and then, as each article reaches a second predetermined point along said path, gradually accelerating the article along a substantial portion of said path to increase the distance between it and the following article.

9. An article conveying apparatus comprising a series of article supports, means for guiding said supports in succession over a predetermined path, first propelling means for propelling a plurality of said supports simultaneously over a first portion of said path at a constant rate and with a uniformly wide spacing between adjacent supports, second propelling means for propelling a plurality of said supports simultaneously over a second portion of said path at a rate gradually reducing from the rate of movement of said first propelling means to a substantially lower rate and with a gradual reduction in the spacing between adjacent supports traversing said second portion of the path, means for disengaging said first propelling means from each one of said supports as each support enters said second portion of said path, and means for engaging said second propelling means with each support substantially simultaneously with the disengagement therefrom of said first propelling means to effect a smooth gradual reduction in the spacing between adjacent articles on said conveying apparatus.

10. An article conveying apparatus comprising a series of article supports, means for guiding said supports in succession over a predetermined path, first propelling means for propelling a plurality of said supports simultaneously over a first portion and also a fourth portion of said path at a constant rate and with a uniformly wide spacing between adjacent supports, second propelling means for propelling a plurality of said supports first over a second portion of said path at a rate gradually reducing from the rate of movement of said first propelling means to a substantially lower rate and then over a third portion of said path at a rate gradually increasing from said lower rate to substantially the rate of movement of said first propelling means, means for disengaging said first propelling means from each one of said supports as each support enters said second portion of said path, means for engaging said second propelling means with each support substantially simultaneously with the disengagement therefrom of said first propelling means, means for disengaging said second propelling means from each one of said supports as each support enters the fourth portion of said path, and means for re-engaging said first propelling means with each support substantially simultaneously with the disengagement therefrom of said second propelling means.

11. An article conveying apparatus comprising a series of article supports, a first conveyor track for guiding said supports in succession over a first predetermined path portion, first propelling means for propelling a plurality of said supports simultaneously over said first path portion at a constant rate and with a uniformly wide spacing between adjacent supports, a second conveyor track for guiding said supports in succession over a second predetermined path portion, second propelling means for propelling a plurality of said supports simultaneously over said second path portion at a rate gradually reducing from the rate of movement of said first propelling means to a substantially lower rate and with a gradual reduction in the spacing between adjacent supports traversing said second path portion, means operative individually on each one of said supports as each support reaches the end of said first path portion for transferring said support from said first conveyor track to said second conveyor track and for disengaging said first propelling means from said support, and means for engaging said second propelling means with each support substantially simultaneously with the disengagement therefrom of said first propelling means to effect a smooth transfer of articles from one conveyor track to the other and a gradual reduction in the spacing between adjacent articles on said conveying apparatus.

References Cited in the file of this patent

UNITED STATES PATENTS

| | | |
|---|---|---|
| 801,523 | Hinchman et al. | Oct. 10, 1905 |
| 1,217,071 | Rust | Feb. 20, 1917 |
| 2,002,507 | Porter | May 28, 1935 |
| 2,261,138 | Bullerjohn | Nov. 4, 1941 |
| 2,335,790 | Ransburg | Nov. 30, 1943 |
| 2,344,476 | Turnbull | Mar. 14, 1944 |
| 2,411,274 | Kerian | Nov. 19, 1946 |
| 2,571,204 | Conti | Oct. 16, 1951 |
| 2,619,916 | Rainer | Dec. 2, 1952 |
| 2,634,851 | Steinhoff | Apr. 14, 1953 |
| 2,651,401 | Vincent | Sept. 8, 1953 |